United States Patent Office 3,556,762
Patented Jan. 19, 1971

3,556,762
INCREASING CARBOHYDRATE DEPOSITION IN PLANTS WITH AMINOPHOSPHONATES
Philip C. Hamm, Glendale, Mo., assignor to Monsanto Company, St. Louis, Mo., a corporation of Delaware
No Drawing. Continuation-in-part of application Ser. No. 668,208, Sept. 15, 1967, which in turn is a continuation-in-part of application Ser. No. 567,093, July 22, 1966. This application Oct. 21, 1968, Ser. No. 769,409
Int. Cl. A01n *9/12, 9/36*
U.S. Cl. 71—86             15 Claims

ABSTRACT OF THE DISCLOSURE

A method of modifying the normal sequential development of plants to agricultural maturity by application to plants of at least one compound of the formula:

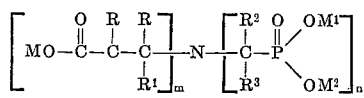

wherein $m$ is one of the integers zero to two, inclusive, and $n$ is one of the integers one to three, inclusive, provided that the sum of $m$ and $n$ is three; R, $R^1$, $R^2$ and $R^3$ are each selected from the group consisting of hydrogen and alkyl having a maximum of four carbon atoms; and M, $M^1$ and $M^2$ are each selected from the group consisting of hydrogen, alkyl having a maximum of four carbon atoms and a salt-forming cation, said compound being applied in an amount sufficient to modify the normal sequential development of plants to agricultural maturity, but in an amount insufficient to exert a herbicidal action.

---

This application is a continuation-in-part of application Ser. No. 668,208, filed Sept. 15, 1967, now abandoned, which in turn is a continuation-in-part of application Ser. No. 567,093, filed July 22, 1966, now abandoned.

In co-pending application Ser. No. 481,940, filed Aug. 23, 1965, now abandoned, certain nitrilo compounds are disclosed and claimed as herbicidal compositions for the killing of a broad spectrum of plants. This was the only biological action taught by the application.

It has now been found that the nitrilo compounds disclosed in the above-identified application and other nitrilo compounds, when applied in an amount insufficient to exert a herbicidal effect, promote a modification, "alteration," to the normal sequential development of plants to agricultural maturity so that certain events occur earlier and are of greater magnitude than normal. This modification or "alteration" will be different for each species. This does not mean however that a different process is occurring but only that the sequential development for each species is different. Some plant species may exhibit more than one alteration of its development as for example in sugar beets there is an increase in root growth plus increase in sucrose concentration.

This modification of sequential development is manifested in several ways. In carbohydrate (including starch) depositing plants, the application of the compounds of this invention leads to an earlier deposition of the carbohydrate and usually in a greater amount. In Irish potatoes and sweet potatoes, the greatest amount of starch-based on grams of starch deposited per time period occurs toward the end of the agricultural maturity cycle. Through the application of the compounds of this invention, this "maximum" deposition period can be advanced in the maturity cycle. The advantages of this controlled deposition are numerous and obvious.

Other plant species, such as grapes, melons, silage crops and citrus and other tree fruits, also show an earlier accumulation of carbohydrates upon application to the plant species one or a combination of compounds of this invention.

In sugar cane and sugar beets there is both an earlier accumulation of carbohydrates and a significant increase in sugar content. In addition it is found that there is an increase in sucrose content with a corresponding decrease in reducing sugars and non-sugar matter. The resultant plant is thus of greater value than the untreated plant.

Another manifestation of modified sequential agricultural development is loss of leaves—defoliation. This sigificantly aids the harvesting of crops. Plant species exhibiting this phenomena include but are not limited to soybeans and cotton.

In accordance with this invention, the modification of the normal sequential development of plants to agricultural maturity, hereafter referred to as "modification in the maturity cycle" is affected by a method which comprises applying to developing plants at least one compound of the formula:

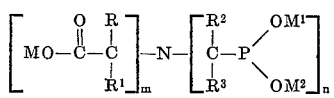

wherein $m$ is one of the integers zero to two, inclusive, and $n$ is one of the integers one to three, inclusive, provided that the sum of $m$ and $n$ is three; R, $R^1$, $R^2$ and $R^3$ are each selected from the group consisting of hydrogen and alkyl having a maximum of four carbon atoms and M, $M^1$ and $M^2$ are each selected from the group consisting of hydrogen, alkyl having a maximum of four carbon atoms, and a salt-forming cation, said compound being applied in an amount sufficient to modify the maturity cycle, but in an amount insufficient to exert a herbicidal action.

In the above formula R, $R^1$, $R^2$, $R^3$, M, $M^1$ and $M^2$ as alkyl can be methyl, ethyl, propyl, isopropyl, n-butyl, sec-butyl, t-butyl or isobutyl. In addition M, $M^1$ and $M^2$ can be any salt-forming cation, for example, alkali metal (Na, K, Li, Rb and Cs), ammonium and aliphatic-substituted ammonium. The preferred alkali metal salts are the mono-, di-, tri-, and tetrapotassium salts, and the like, as well as mixtures of alkali metal salts.

The preferred amine salts are those prepared from amines having a low molecular weight below about 300, and more particularly the alkyl amines, alkylene amines and alkanol amines containing not more than 2 amine groups such as methylamine, ethylamine, n-propylamine, isopropylamine, isoamylamine, hexylamine, heptylamine, octylamine, nonylamine, decylamine, undecylamine, dodecylamine, tridecylamine, tetradecylamine, pentadecylamine, hexadecylamine, heptadecylamine, octadecylamine, methylethylamine, methylisopropylamine, methylhexylamine, methylnonylamine, methylpentadecylamine, methyloctadecylamine, ethylbutylamine, ethylheptylamine, ethyloctylamine, hexylheptylamine, hexyoctylamine, dimethylamine, diethylamine, di-n-propylamine, diisopropylamine, di-n-butylamine, diisobutylamine, di-sec-butylamine, di-n-amylamine, diisoamylamine, dihexylamine, diheptylamine, dioctylamine, trimethylamine, triethylamine, tri-n-propylamine, triisopropylamine, tri-n-butylamine, triisobutylamine, tri-secbutylamine, tri-n-amylamine, ethanolamine, n-propanolamine, diethanolamine, triethanolamine, N-butylethanolamine and propylenediamine.

The most preferred compounds for use in the methods of this invention are represented by the following formula:

II

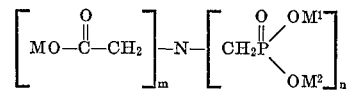

wherein $m$ and $n$ are integers from 1 to 2 provided that the sum of $m$ and $n$ is 3, and M, $M^1$ and $M^2$ are selected from the group consisting of hydrogen, an alkali metal (Na, K, Li, Rb and Cs), and

wherein $R^4$, $R^5$ and $R^6$ are selected from the group consisting of hydrogen and alkyl of not more than 4 carbon atoms.

For the sake of brevity, the term "active ingredient" is used hereinafter in the specification to describe the compounds of Formulae I and II above which are useful in accordance with the methods of this invention.

The active ingredients useful in the methods of this invention are generally well known in the art. The nitrilotri(methylenephosphonic acid) and derivatives thereof can be prepared by reaction of ammonia, formaldehyde (or other aldehydes or ketones) and $H_3PO_3$ under acidic conditions as is disclosed in co-pending application Ser. No. 152,048 filed Nov. 13, 1961, now U.S. Pat. 3,288,846. The phosphonic acid and derivatives thereof can also be prepared by reaction of ammonia, formaldehyde (other aldehydes or ketones) and $HP(O)(alkyl)_2$ to form the nitrilotri(methylenephosphonate ester) and hydrolyzing the ester to the acid.

The mixed carboxylic-phosphonic acids which are the preferred compounds, can be prepared by reaction of the appropriate amino acid, formaldehyde (other aldehydes or ketones) and $H_3PO_3$ under acidic conditions as is disclosed in co-pending application Ser. No. 152,048, filed Nov. 13, 1961, now U.S. Pat. 3,288,846.

The time of application of the active ingredients to the plant will vary with each plant species and with the effect desired.

Application to cotton and soybean plants is made at or near harvesting time in order that the plant is defoliated after the plant has reached its "harvesting maturity."

Where an increase in or early depositing of carbohydrate is desired, the active ingredients are applied prior to the time the plant has reached maturity. Preferably, the active ingredients are applied 5 days to 5 months prior to harvest, with applications of 2 weeks to 3 months prior to harvest being particularly advantageous.

Application to sugar cane is preferable at a period 2 weeks to 2 months prior to harvest; with sugar beets application is preferred at a period 10 days to 1 month prior to harvest; and with Irish potatoes and sweet potatoes 10 days to 6 weeks.

As mentioned hereinbefore, the active ingredients are applied in an amount sufficient to modify the maturity cycle of plants, but in an amount insufficient to exert a herbicidal action. Such amounts are determined by and dependent upon the particular active ingredient selected, the method of the application, the particular plant species, the state and condition of growth of the plant and the climatic conditions.

For many species of the dicotyledonous group, which includes sugar beets, cotton, soybeans, sweet potatoes, Irish potatoes and similar species, the rate of application for modifying the maturity cycle without herbicidal action is in the approximate range of 0.1 to 4 pounds per acre, with the preferred range being about 0.25 to about 1.5 pounds per acre.

For species of the monocotyledonous group, such as sugar cane and similar species, the rate of application is in the approximate range of 0.1 to 10 pounds per acre, with a preferred range of about 3 to about 7 pounds per acre.

The following examples illustrate the invention. Parts and percent are by weight unless otherwise indicated.

EXAMPLE 1

Six month old sugar cane (Pinder) plants grown under greenhouse conditions at a temperature from about 70° F. to about 90° F. and 65% relative humidity are sprayed with acetone-water solutions containing a small amount of emulsifier and various amounts of nitrilodi(acetic acid)(methyl phosphonic acid) at a rate equivalent to about 70 gallons of spray per acre. The sprays are applied at rates of one, four and ten pounds of nitrilo compound per acre using Randomized Block with six replications of each application rate including control (no active ingredient). Harvesting is carried out three weeks after spraying and the amount of sucrose is measured and recorded. Results and further details are given in Table I wherein results are expressed as a percent of the control.

TABLE I

| Application rate, lb./acre: | Total weight of sucrose per stalk |
|---|---|
| Control—0 | 100 |
| 1 | 114 |
| 4 | 100 |
| 10 | 162 |

EXAMPLE 2

The spraying procedure of Example 1 is repeated at a rate of about 5 pounds of nitrilodi(acetic acid)(methyl phosphonic acid) per acre. After spraying, the sugar cane plants are held at a temperature of about 79° F. over the 12-hour "daylight" period and about 72° F. over the 12-hour "night" period. Harvesting is carried out with different groups of plants at intervals of 4 weeks and 8 weeks after spraying. Results and further details are given in Table II below wherein all results are expressed as a percent of the control.

TABLE II.—PERCENT FRESH WEIGHT OF SUCROSE IN STALKS

| Application rate, lb./acre | Harvest | |
|---|---|---|
| | 4 weeks | 8 weeks |
| Control (0) | 100 | 100 |
| 5 | 147 | 214 |

It is apparent from the data in Tables I and II that the nitrilo compound significantly increased the maximum sugar content of the sugar cane when applied in accordance with the methods of this invention. The increase in sugar content was brought about by the nitrilo compound without herbicidal action on the sugar cane.

EXAMPLE 3

Sugar beets growing in field test plots were sprayed with nitrilo(acetic acid)di(methyl phosphonic acid) at a rate of 0.5 pound per acre of active ingredient. Harvesting was carried out 30 days after spraying. Results and details are given in Table III below wherein all results are expressed as a percent of the control.

TABLE III

| Application rate, lb./acre | Sugar beet root yield | Recoverable sugar yield |
|---|---|---|
| Control (0) | 100 | 100 |
| ½ | 109.4 | 110.7 |

EXAMPLE 4

Eight week old cotton plants were sprayed with active ingredients at several application rates. Fourteen days after spraying the results were observed and recorded. The defoliation activity index used in Table IV is defined as follows.

| Percent defoliation. | Rating |
|---|---|
| 0 | E |
| 1–25 | A |
| 26–50 | B |
| 51–75 | C |
| 76–99 | D |
| 100 | F |

Results and further details are given in Table IV.

TABLE IV

| Compound | Rate, lb./acre | Defoliation index |
|---|---|---|
| Dipotassium iminodiacetate N-methyl-O-potassium-O-ethyl-phosphonate | ½ | B |
| Trisodium iminodiacetate N-methyl-phosphonate | ½ | B |

EXAMPLE 5

Cotton plants growing in the field with some bolls open at the bottom were sprayed with nitriloidi (acetic acid) (methylphosphonic acid). The defoliation activity index used in Table V is defined as in Example 4 above. Seven days after spraying the results were observed and recorded. Results and further details are given in Table V below.

TABLE V

Compound—Nitrilodi(acetic acid)(methylphosphonic acid)
Rate, lb./acre—½
Refoliation index—D Other nitrilo compounds of the above formulae which can be used in accordance with the methods of this invention to increase the maturation rate of plants include the following.

(1) 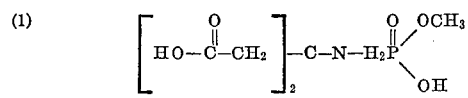

(2) 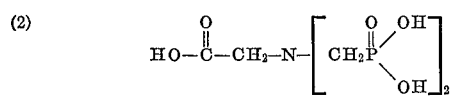

(3) 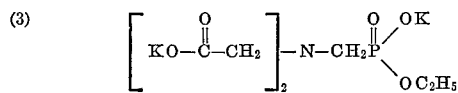

(4) tris(dimethyl ammonium) iminoacetate N-methyl phosphonate (dimethylamine salt of (1))
(5) trisodium iminodiacetate N-methyl phosphonate (sodium salt of (1))
(6) tetra(dimethyl ammonium)aminoacetate N,N - bismethyl phosphonate (dimethyl amine salt of (2))

(7) 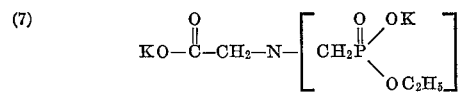

(8) 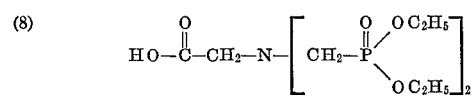

(9) 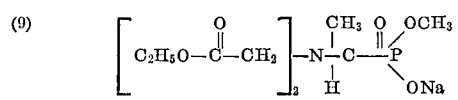

(10) 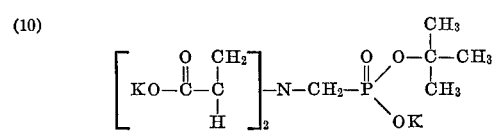

(11) 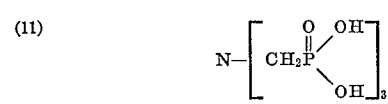

(12) 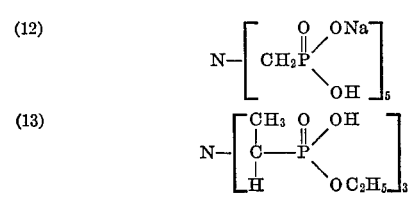

(13) 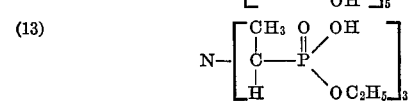

In practicing the methods of this invention the active ingredients can be used alone or in combination with an adjuvant in liquor or solid form. The compositions are prepared by admixing the active ingredient with an adjuvant including diluents, extenders, spreaders, adhesives, carriers and conditioning agents to provide compositions in the form of finely-divided particulate solid, a liquid of organic origin, water, a wetting agent, dispersing agent, an emulsifying agent or any suitable combination of these.

Typical finely-divided solid carriers and extenders which can be used in the compositions of this invention include for example, the talcs, clays, pumice, silica, lime, calcium carbonate, diatomaceous earth, quartz, fuller's earth, salt, sulfur, powdered wood, cotton seed hulls, wheat flour, soybean flour, walnut flour, chalk, tobacco dust, volanic ash, charcoals and the like. Typical liquid diluents include for example, water, kerosene, Stoddard solvent, hexane, benzene, toluene, acetone, ethylene dichloride, xylene, alcohols, diesel oil, glycols and the like.

The compositions useful in this invention, particularly liquids and wettable particles, usually contain as a conditioning agent one or more surface-active agents in amounts sufficient to render a given composition readily dispersible in water or in oil. By the term "surface-active agent" it is understood that wetting agents, dispersing agents, suspending agents and emulsifying agents are included therein.

Preferred compositions containing the active ingredients have been developed so that the active ingredients can be used to the greatest advantage to increase the maturation rate of plants. The preferred compositions comprise certain wettable powders, aqueous suspensions, dust formulations, emulsifiable oils and solutions in solvents. In general, these preferred compositions all contain one or more surface-active agents.

Surface-active agents which can be used in the compositions useful in this invention are set out, for example, in Searle U.S. Pat. 2,426,417; Todd U.S. Pat. 2,655,447; Jones U.S. Pat. 2,412,510 and Lenher U.S. Pat. 2,139,276. A detailed list of such agents is also set forth by J. W. McCutcheon in "Soap and Chemical Specialties," November 1947, p. 8011 et seq., entitled "Synthetic Detergents"; "Detergents and Emulsifiers—Up to Date" (1960), by J. W. McCutcheon, Inc., and Bulletin E–607 of the Bureau of Entomology and Plant Quarantine of the U.S.D.A. In general, less than 15 parts by weight of the surface-active agent is present per 100 parts by weight of the composition.

Wettable powders are water-dispersible compositions containing one or more active ingredients, an inert solid extender and one or more wetting and dispersing agents. The inert solid extenders are usually of mineral origin such as the natural clays, diatomaceous earth and synthetic minerals derived from silica and the like. Examples of such extenders include kaolinites, attapulgite clay and synthetic magnesium silicate.

Preferred wetting agents are alkyl benzene and alkyl naphthalene sulfonate, sulfated fatty alcohols, amines or acid amides, long chain acid esters of sodium isethionate, esters of sodium sulfosuccinate, sulfated or sulfonated fatty acid esters, petroleum sulfonates, sulfonated vegetable oils and ditertiary acetylinic glycols. Preferred dispersants are methyl cellulose, polyvinyl alcohol, sodium lignin sulfoates, polymeric alkyl naphthalene sulfonates, sodium naphthalene sulfonate, polymethylene bisnaphthalenesulfonate and sodium N-methyl-N-(long chain acid) taurates.

The wettable powder compositions usually contain from about 5 to about 95 parts of active ingredient, from about 0.25 to about 15.0 parts of wetting agent, from about 0.25 to about 15 parts of dispersant and from about 4.5 to about 94.5 parts of inert solid extender, all parts being by weight of the total composition. Where required, from about 0.1 to 2.0 parts by weight of the solid inert extender can be replaced by a corrosion inhibitor or anti-foaming agent or both.

Aqueous suspensions are usually prepared by mixing together an aqueous slurry of water-insoluble active ingredient in the presence of a dispersing agent to obtain a concentrated slurry of very finely-divided particles. The resulting concentrated aqueous suspension is characterized by its extremely small particle size, so that when diluted and sprayed coverage is very uniform. If the particular active ingredient selected is water-soluble, the solution formed by admixture with water or other aqueous media can be employed in the methods of this invention without further formulation.

Emulsifiable oils are usually solutions of active ingredient in water-immiscible solvents together with a surfactant. Suitable surfactants are anionic, cationic and non-ionic such as alkyl aryl polyethoxy alcohols, alkyl and alkyl aryl polyether alcohols, polyethylene sorbitol or sorbitan fatty acid esters, polyethylene glycol fatty esters, fatty alkyllol amide condensates, quaternary ammonium salts, amine salts of fatty alcohol sulfates together with long chain alcohols and oil soluble petroleum sulfonates or mixtures thereof. Examples of suitable surfactants, include but is not limited to aliphatic amines-ethylene oxide reaction products (Ethomeen 18/20; Armour and Co.; Atlas G–3780A; Atlas Chemical Co.); cetypryridinium bromide; alkyl dimethyl 3,4 dichlorobenzyl ammonium chloride (Tetrosan 3,4 D; Onyx Oil and chemical Co.); quaternary ammonium salts (Hyamine 2389; Rohm and Haas); alkyl trimethyl ammonium chloride and dialkyl dimethyl ammonium chloride (Araquad 12; Armour and Co.); aliphatic 1°, 2° and 3° amines (Armeen DMSD; Armour and Co.); dimethyl dilauryl ammonium chloride (Isothan DL–1; Onyx Oil and Chemical Co.); and polyoxyethylene ethers (Sterox 66–L; Monsanto Co.). The emulsifiable oil compositions generally contain from about 5 to 95 parts active ingredient, about 1 to 50 parts surfactant and about 4 to 94 parts solvent, all parts being by weight based on the total weight of emulsifiable oil.

When operating in accordance with the present invention, effective amounts of the active ingredients are applied to plants in any convenient fashion. The application of the compositions to the plant can be carried out by conventional methods, e.g., power dusters, boom and hand sprayers and spray dusters. The compositions can also be applied from airplanes because of their effectiveness at low dosages.

While the illustrative embodiments of the invention have been described hereinbefore with particularity, it will be understood that various other modifications will be apparent to and can readily be made by those skilled in the art without departing from the scope and spirit of the invention.

What is claimed is:

1. A method of increasing carbohydrate deposition in plants which comprises applying to the maturing plant a compound of the formula 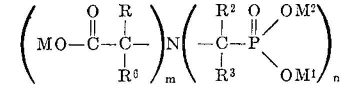 wherein *m* is one of the integers zero to two, inclusive, and *n* is one of the integers one to three, inclusive, provided that the sum of *m* and *n* is 3; R, $R^1$, $R^2$ and $R^3$ are each selected from the group consisting of hydrogen and alkyl having a maximum of four carbon atoms; and M, $M^1$ and $M^2$ are each selected from the group consisting of hydrogen, alkyl having a maximum of four carbon atoms and a salt-forming cation selected from the group consisting of alkali metal, ammonium and aliphatic substituted ammonium having a molecular weight below about 300, said aliphatic substituted ammonium being selected from the group consisting of alkylamine, alkyleneamine and alkanolamine; said compound being applied in an amount sufficient to modify the normal sequential development of plants to agricultural maturity but in an amount insufficient to exert a herbicidal action.

2. A method in accordance with claim 1, in which *m* is one.

3. A method in accordance with claim 1, in which *m* is two.

4. A method in accordance with claim 1, in which *n* is three.

5. A method in accordance with claim 1, in which M, $M^1$ and $M^2$ are hydrogen.

6. A method in accordance with claim 1, in which M, $M^1$ and $M^2$ are alkali metal.

7. A method in accordance with claim 1 in which M, $M^1$ and $M^2$ are the group 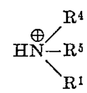 wherein $R^4$, $R^5$ and $R^6$ is selected from the group consisting of hydrogen and alkyl having a maximum of four carbon atoms.

8. Method of claim 1, wherein the compound is

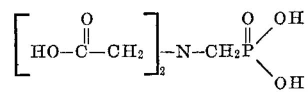

9. Method of claim 1, wherein the compound is

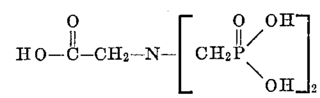

10. Method of claim 1, wherein the compound is

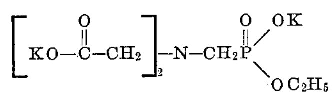

11. Method of claim 1, wherein the compound is

12. A method in accordance with claim 1, in which said carbohydrate is sucrose and said plant is sugar cane.

13. A method in accordance with claim 1, in which said carbohydrate is starch and said plant is Irish potatoes.

14. A method in accordance with claim 1, in which said carbohydrate is sucrose and said plant is sugar beet.

15. A method in accordance with claim 1 in which said carbohydrate is starch and said plant is sweet potatoes.

References Cited

UNITED STATES PATENTS

| | | | |
|---|---|---|---|
| 3,455,675 | 7/1969 | Irani | 71—86 |
| 3,094,405 | 6/1963 | Toy et al. | 71—71 |
| 3,288,846 | 11/1966 | Irani et al. | 260—502.5 |
| 3,298,956 | 1/1967 | Irani et al. | 260—502.5 |
| 3,378,610 | 4/1968 | Gier | 71—71 |
| 3,415,905 | 12/1968 | Garner | 71—71 |

OTHER REFERENCES

Nickell et al.: "Effects of Chemicals on Ripening of Sugarcane," Haw. Sugar Technol. 24th Ann. Conf., November 1965, pp. 152–6 and 162.

LEWIS GOTTS, Primary Examiner

G. HOLLRAH, Assistant Examiner

U.S. Cl. X.R.

71—71, 76

UNITED STATES PATENT OFFICE
CERTIFICATE OF CORRECTION

Patent No. 3,556,762      Dated January 19, 1971

Inventor(s) Philip C. Hamm

It is certified that error appears in the above-identified patent and that said Letters Patent are hereby corrected as shown below:

In the Abstract of the Disclosure, column 1, that port of the formula reading

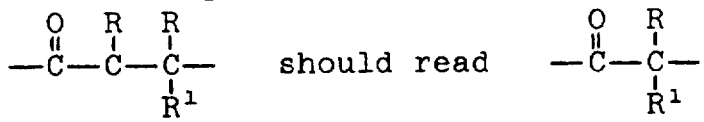

In column 5, at about line 29, that portion of formula reading

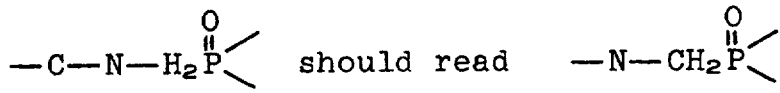

In column 5, at about line 56, that portion of formula reading

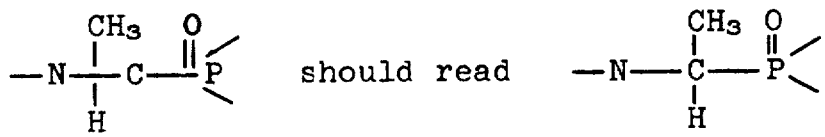

In column 5, at about line 61, that portion of formula reading

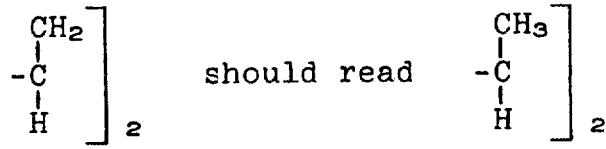

In column 7, at about line 58, that portion of the for in Claim 1 reading     $R^6$     should read    $R^1$ In column 8, at about line 17, that portion of the for in Claim 7 reading     $R^1$     should read    $R^6$ Signed and sealed this 14th day of December 1971.

(SEAL)
Attest:

EDWARD M. FLETCHER, JR.           ROBERT GOTTSCHALK
Attesting Officer                 Acting Commissioner of Paten